(12) United States Patent
Schrooten et al.

(10) Patent No.: US 7,078,118 B2
(45) Date of Patent: Jul. 18, 2006

(54) PERFORMANCE ENHANCING BREAK-IN METHOD FOR A PEM FUEL CELL

(75) Inventors: Jeremy A. Schrooten, Hebron, CT (US); Jesse M. Marzullo, Ellington, CT (US); Michael L. Perry, South Glastonbury, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 97 days.

(21) Appl. No.: 10/702,181

(22) Filed: Nov. 5, 2003

(65) Prior Publication Data
US 2005/0095472 A1    May 5, 2005

(51) Int. Cl.
*H01M 8/04* (2006.01)
*H01M 8/00* (2006.01)
*H01M 8/18* (2006.01)
*H01M 8/12* (2006.01)
*H01M 8/10* (2006.01)
*H01M 2/14* (2006.01)

(52) U.S. Cl. .............. 429/17; 429/13; 429/19; 429/22; 429/30; 429/33; 429/38; 429/39

(58) Field of Classification Search .......... 429/3, 429/12, 13, 17, 23, 26, 52, 112, 219; 324/444, 324/713; 320/101
See application file for complete search history.

(56) References Cited

U.S. PATENT DOCUMENTS

| 3,544,380 | A  | * | 12/1970 | Dey .......................... 429/13 |
| 5,601,936 | A  | * | 2/1997  | Dudfield et al. ............. 429/13 |
| 6,576,356 | B1 | * | 6/2003  | Hallum ....................... 429/13 |
| 6,589,686 | B1 | * | 7/2003  | Ovshinsky et al. .......... 429/52 |
| 2003/0224227 | A1 | * | 12/2003 | Voss et al. .................. 429/13 |

* cited by examiner

*Primary Examiner*—Bruce F. Bell
*Assistant Examiner*—Robert Hodge
(74) *Attorney, Agent, or Firm*—Malcolm J. Chisholm, Jr.

(57) ABSTRACT

A performance enhancing break-in method for a proton exchange membrane ("PEM") fuel cell (12) includes cycling potentials of an anode electrode (14) and a cathode electrode (16) from a first potential to a second potential and back to the first potential, and repeating the cycling for each electrode (14, 16) for at least two electrode cycles. The potential cycling may be achieved in a first embodiment by applying a direct current from a programmable direct current power source (80) to the electrodes. Alternatively the potential cycling may be achieved by varying reactants to which the anode and cathode electrodes (14, 16) are exposed.

5 Claims, 3 Drawing Sheets

PERFORMANCE ENHANCING BREAK-IN METHOD FOR A PEM FUEL CELL

TECHNICAL FIELD

The present invention relates to fuel cells that are suited for usage in transportation vehicles, portable power plants, or as stationary power plants, and the invention especially relates to a break-in procedure for fuel cells that accelerates a known break-in procedure and enhances performance of the fuel cell.

BACKGROUND ART

Fuel cells are well-known and are commonly used to produce electrical energy from reducing and oxidizing reactant fluids to power electrical apparatus, such as apparatus on-board space vehicles, transportation vehicles, or as on-site generators for buildings. A plurality of planar fuel cells are typically arranged into a cell stack surrounded by an electrically insulating frame structure that defines manifolds for directing flow of reducing, oxidant, coolant and product fluids as part of a fuel cell power plant. Each individual fuel cell generally includes an anode electrode and a cathode electrode separated by an electrolyte, such as a proton exchange membrane ("PEM") electrolyte, as is well known.

It is also known that manufacture of PEM fuel cells involves a substantial break-in period after a fuel cell is assembled in order to get the fuel cell to achieve peak performance of a maximum, consistent current output at a specific voltage. Such break-in periods often exceed 100 hours of operation of the fuel cell. In a PEM fuel cell, the PEM electrolyte is typically secured between an anode catalyst layer and a cathode catalyst layer. The catalyst layers are known to be supported on carbon support materials to maximize surface areas of the catalysts available for contact with reactant streams, and to provide for flow of the reactant and product fluids to and away from the catalyst layers. The catalyst layers secured to such support materials are frequently characterized as either a cathode electrode or an anode electrode. The electrodes are secured on opposed sides of the PEM electrolyte to form a membrane electrode assembly ("MEA"), as is known in the art. A PEM electrolyte is an ionomer, and the electrodes may also include ionomers to facilitate ion movement through the MEA during operation of the fuel cell.

It is theorized that the electrodes, ionomers within the electrodes, and the PEM electrolyte are slowly wetted during the break-in period. By being fully wetted, ionic resistance of the MEA is reduced, and effective surface areas of the catalysts available for fuel cell electrochemical reactions are increased, thereby enhancing performance of the fuel cell. As fuel cells commence high volume production to meet transportation needs, however, such lengthy break-in periods are a significant, and unacceptable cost burden.

Accordingly, there is a need for an accelerated break-in procedure for a fuel cell that reduces a total time period necessary for bringing the fuel cell to peak performance.

DISCLOSURE OF INVENTION

The invention is a performance enhancing break-in method for a proton exchange membrane fuel cell that includes a cathode electrode and an anode electrode secured to opposed sides of a proton exchange membrane ("PEM") electrolyte. The method comprises the steps of first cycling a potential of the cathode electrode for a first cathode cycle by changing the potential of the cathode electrode from a first cathode potential to a second cathode potential for a predetermined duration or at a predetermined rate and then changing the potential of the cathode electrode from the second cathode potential back to the first cathode potential. Next, the cycling of the potential of the cathode electrode is repeated for at least a second cathode cycle.

The method also includes cycling a potential of the anode electrode for a first anode cycle by changing the potential of the anode electrode from a first anode potential to a second anode potential for a predetermined duration or at a predetermined rate, and then changing the potential of the anode electrode from the second anode potential back to the first anode potential. Then, the cycling of the potential of the anode electrode is repeated for at least a second anode cycle. Additionally, in cycling the potentials of the cathode and anode electrodes, the potentials of the electrodes are cycled within a potential range of between 0.00 volts and 1.20 volts.

The cycling of the potentials of the cathode and anode electrodes may be achieved through either a first or second embodiment of the invention. The cycling of the potentials is accomplished in the first embodiment by application of a programmable direct current ("D.C.") power source to the electrodes. The first embodiment may be referred to herein for convenience also as an applied voltage embodiment. The current from a D.C. power supply delivers or removes electrons, which causes the potential of the electrode to change in a controlled manner. For example, to cycle the potential of the cathode electrode for the first cathode cycle, a positive terminal of the D.C. power source is connected to the cathode electrode and the negative terminal is connected to the anode electrode. The anode electrode is exposed to a hydrogen containing reducing fluid reactant and the cathode electrode is exposed to an inert gas, such as nitrogen. The D.C. power supply changes the cathode potential a specific variation for a specific duration for each cathode cycle. A similar process is then performed with the positive terminal connected to the anode electrode and the negative terminal connected to the cathode electrode with the above-described purge gases reversed to perform the anode cycle.

The cycling of the potentials of the cathode and anode electrodes may be achieved in a second embodiment of the invention by alternating reactant streams to which the electrodes are exposed. The second embodiment may be referred to herein for convenience also as a varying reactant embodiment. The invention also includes a system for performing the method.

Accordingly, it is a general purpose of the present invention to provide a performance enhancing break-in method and system for a PEM fuel cell that overcomes deficiencies of the prior art.

It is a more specific purpose to provide a performance enhancing break-in method and system for a PEM fuel cell that reduces a duration of a fuel cell break-in, and that enhances performance of the broken-in fuel cell.

These and other purposes and advantages of the present performance enhancing break-in method for a PEM fuel cell will become more readily apparent when the following description is read in conjunction with the accompanying drawings.

DESCRIPTION OF THE PREFERRED EMBODIMENTS

Figure 1:
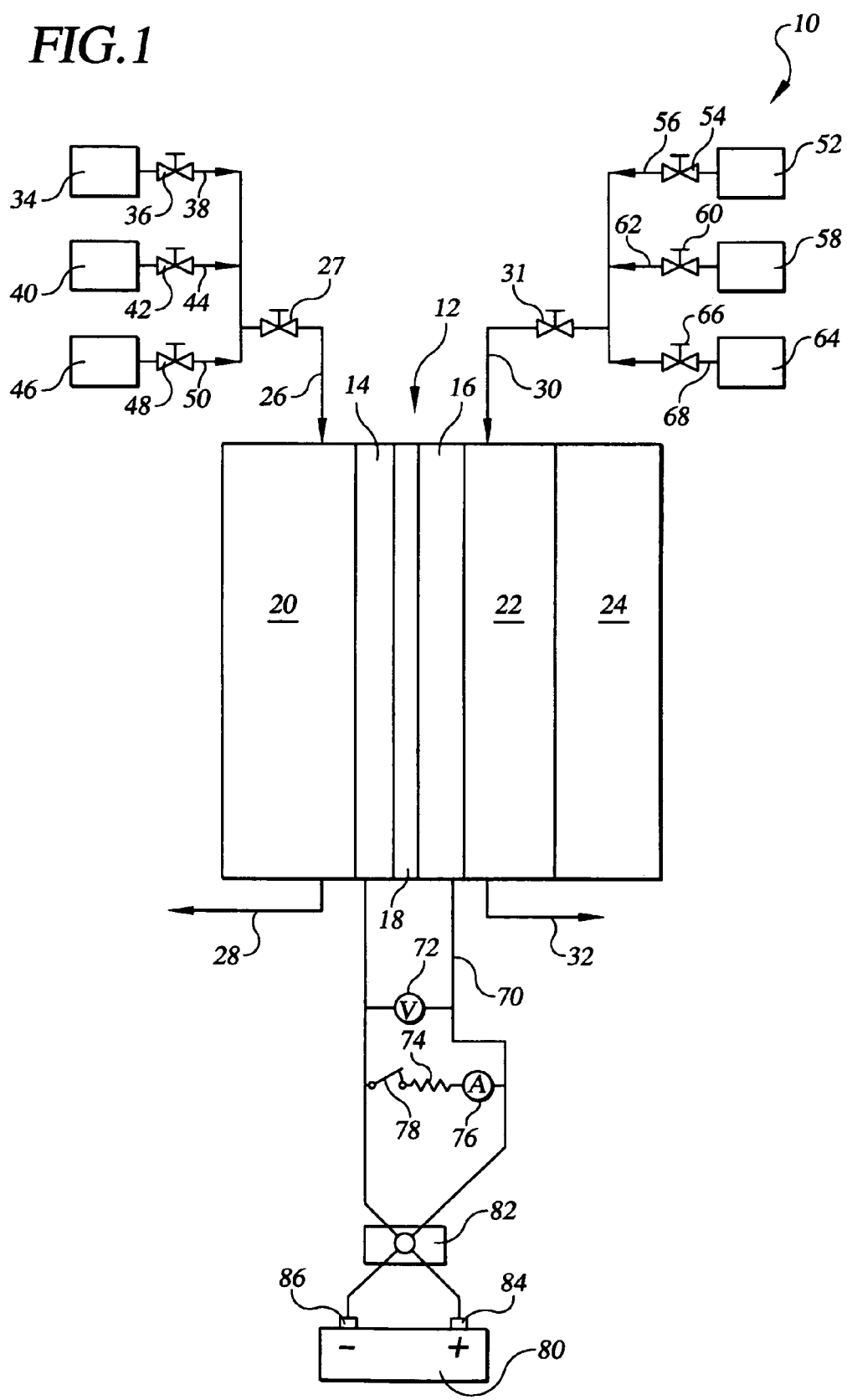
FIG. 1 is a simplified schematic representation of a preferred embodiment a fuel cell break-in system including components appropriate for application of the performance enhancing break-in method for a PEM fuel cell of the present invention.

Referring to the drawings in detail, FIG. 1 shows, a fuel cell break-in system 10 including components appropriate for applying the performance enhancing break-in method for a proton exchange membrane ("PEM") electrolyte fuel cell of the present invention. The system 10 includes a fuel cell 12 having an anode electrode 14 and a cathode electrode 16 secured adjacent opposed sides of a PEM electrolyte 18 forming a well-known membrane electrode assembly ("MEA"). An anode flow field 20 is secured adjacent the anode electrode 14 for directing flow of reactant streams adjacent the electrode 14, and a cathode flow field 22 is secured adjacent the cathode electrode 16 for directing flow of reactant streams adjacent the cathode electrode 16. A water transport or separator plate 24 may also be secured adjacent the cathode flow field 22 as is known in the art, for cooling the cell 12 and/or removing product water and humidifying reactant streams, etc.

An anode inlet 26 including an anode inlet valve 27 directs reactant streams into the anode flow field 20, and an anode exhaust 28 directs an anode exhaust stream out of the fuel cell 12. A cathode inlet 30 including a cathode inlet valve 31 directs reactant streams into the cathode flow field 22, and a cathode exhaust 32 directs a cathode exhaust stream out of the fuel cell 12. An anode hydrogen containing reducing fluid reactant source 34 is secured in fluid communication through valve 36 and line 38 with the anode inlet 26 for selectively directing the reducing fluid to flow through the anode flow field 20. An anode inert gas source 40 is secured in fluid communication through valve 42 and line 44 with the anode inlet 26 for selectively directing the inert gas to flow through the anode flow field 20. Also, an anode oxidant reactant source 46 is secured in fluid communication through valve 48 and line 50 with the anode inlet 26 for selectively directing an oxidant reactant to flow through the anode flow field 20. Similarly, a cathode hydrogen containing reducing fluid source 52 is secured in fluid communication through valve 54 and line 56 with the cathode inlet 30 for selectively directing a reducing fluid to flow through the cathode flow field 22. A cathode inert gas storage source 58 is secured in fluid communication through valve 60 and line 62 with the cathode inlet 30 for selectively directing an inert gas to flow through the cathode flow field 22. Also, a cathode oxidant source 64 is secured in fluid communication through valve 66 and line 68 with the cathode inlet 30 for selectively directing an oxidant to flow through the cathode flow field 22.

It is stressed that the above description of the system 10 as having the described separate anode and cathode sources for the anode and cathode flow fields 20, 22 is shown in such a manner primarily for ease of explanation of the methods of the invention, and that single sources of reactants and/or inert gases with appropriate single or multiple known valve means and lines for performing the described functions rather than separate valves, lines or sources would also provide for performance of the methods of the invention.

The system 10 also includes a power circuit 70 secured in electrical communication with the electrodes 14, 16. The fuel cell 12 may be integrated with a plurality of similar fuel cells (not shown) assembled in a well known fuel cell stack assembly, wherein the power circuit 70 would be secured in electrical communication in a well known manner with all of the fuel cells to conduct current out of the cell stack assembly, and so that the methods of the invention would break-in all of the fuel cells of the stack at the same time. A voltmeter 72 is secured in parallel with the power circuit 70, and a primary electrical load 74 is likewise secured in parallel with the power circuit 70 and also in series with an amp meter 76 and a load switch 78. A programmable direct current ("D.C.") power supply 80 including a polarity-reversing means such as a known polarity reversing switch 82 is secured to the power circuit 70 so that the switch 82 may direct either a positive terminal 84 or a negative terminal 86 of the power supply 80 to be selectively connected to either the anode electrode 14 or the cathode electrode 16.

Use of the described, exemplary fuel cell system 10 is summarized in the following two tables, wherein "TABLE 1", shows use of the fuel cell system 10 for a first embodiment, or applied voltage embodiment of the methods of the invention. "TABLE 2" shows use of the fuel cell system 10 for a second embodiment, or a varying reactant embodiment of the methods of the invention. TABLE 2 also shows a prior art break-in method.

TABLE 1

EMBODIMENT #1 - APPLIED VOLTAGE EMBODIMENT

| EMBODIMENT #1 | STEP | Gas On Anode | Gas On Cathode | Primary Load Switch | DC Power Supply Positive Terminal | Electrode Potential | Current Density |
|---|---|---|---|---|---|---|---|
| Cathode Filling Cycles | 1 | 4% H$_2$-N$_2$ | N$_2$ | Open | Connected To Cathode | Cathode 0.04 V to 1.04 V | Low |
|  | 2 | 4% H$_2$-N$_2$ | N$_2$ | Open | Connected To Cathode | Cathode 1.04 V to 0.04 V | Low |
|  | 3 | repeat step #1 |  |  |  |  | Low |
|  | 4 | repeat step #2 |  |  |  |  | Low |
|  | 5 | repeat step #1 |  |  |  |  | Low |
|  | 6 | repeat step #2 |  |  |  |  | Low |

TABLE 1-continued

EMBODIMENT #1 - APPLIED VOLTAGE EMBODIMENT

| EMBODIMENT #1 | STEP | Gas On Anode | Gas On Cathode | Primary Load Switch | DC Power Supply Positive Terminal | Electrode Potential | Current Density |
|---|---|---|---|---|---|---|---|
| Anode Filling | 7 | $N_2$ | 4% $H_2$-$N_2$ | Open | Connected To Anode | Anode 0.04 V to 1.04 V | Low |
| Cycles | 8 | $N_2$ | 4% $H_2$-$N_2$ | Open | Connected To Anode | Anode 1.04 V to 0.04 V | Low |
| | 9 | repeat step #7 | | | | | Low |
| | 10 | repeat step #8 | | | | | Low |
| | 11 | repeat step #7 | | | | | Low |
| | 12 | repeat step #8 | | | | | Low |
| Performance Calibration | 13 | $H_2$ | Air | Closed | Not Connected | Dependent on current density | 0–1600 mASC |
| | 14 | repeat step #13 up to 10 times | | | | | |

TABLE 2

EMBODIMENT #2 - VARYING REACTANT EMBODIMENT

| EMBODIMENT #2 | STEP | Gas On Anode | Gas On Cathode | Primary Load Switch | DC Power Supply Positive Terminal | Electrode Potential | Current Density | Time |
|---|---|---|---|---|---|---|---|---|
| Cathode Filling | 1 | 100% $H_2$ | $N_2$ | Open | Not Connected | Cathode 0.95 V to 0.00 V | Zero | 2 min. |
| Cycles | 2 | 100% $H_2$ | Air | Open | Not Connected | Cathode 0.00 V to 0.95 V | Zero | 1.5 min. |
| | 3 | repeat step #1 followed by step #2 for total of 10 cycles | | | | | | |
| Anode Filling | 4 | $N_2$ | 100% $H_2$ | Open | Not Connected | Anode 0.95 V to 0.00 V | Zero | 2 min. |
| Cycles | 5 | Air | 100% $H_2$ | Open | Not Connected | Anode 0.00 to 0.95 V | Zero | 1.5 min. |
| | 6 | repeat step #4 followed by step #5 for total of 10 cycles | | | | | | |
| Performance Calibration | 7 | $H_2$ | Air | Closed | Not Connected | Dependent on current density | 0–1600 mASC | |
| | 8 | repeat step #7 up to 10 times | | | | | | |
| Prior Art | 1 | $H_2$ | Air | Closed | Not Connected | Dependent on current density | 0–1000 mASC | |
| | 2 | repeat step #1 up to 10 times | | | | | | |

As shown in TABLE 1, in the first or applied voltage embodiment, for the cathode cycle, the D.C. power supply 80 has its positive terminal 84 connected to the cathode electrode 16 and raises the potential of the cathode electrode 16 from about 0.04 volts ("V") to about 1.04V, for Step 1, and then in Step 2 changes the potential back to about 0.04V, as could be measured by the voltmeter 72. (All references herein to "potentials" are relative to a standard hydrogen electrode ("SHE") known in the art.) In Steps 3–6, that procedure is repeated to produce two additional cathode cycles. For an anode cycle, the D.C. power supply 80 has its positive terminal switched by the polarity reversing switch 82 to be connected to the anode electrode 14, and also raises the potential of the anode electrode 14 from about 0.04 volts ("V") to about 1.04V for Step 7, and then for Step 8, changes the potential back to about 0.04V. That procedure is repeated in Steps 9–12 of TABLE 1 to produce two additional anode cycles.

During the cathode cycles, the cathode electrode 16 is exposed to an inert gas, such as nitrogen gas directed to flow from the cathode inert gas source 58, and the anode electrode 14 is exposed to a hydrogen containing gas that may be directed from the anode hydrogen source 34, or to a mixture of a reducing fuel and an inert gas directed from the anode inert gas source 40 shown in FIG. 1. During the anode cycles the cathode electrode 16 is exposed to a pure reducing fluid reactant, such as hydrogen gas directed from the anode reducing fluid source 52, or a mixture of a reducing fluid and an inert gas from the cathode inert gas source 58, and the anode electrode 14 is exposed to the inert gas from the anode inert gas source 40. The electrode exposed to the hydrogen containing reducing fuel serves as a reference electrode in the fuel cell 12. The potential of the electrode is approximately 0.00 volts versus the "SHE" if the fuel is 100% hydrogen, and approximately 0.04 volts if the fuel stream is about a 4% hydrogen-inert gas mixture, such as 4% hydrogen and 96% $N_2$. The potential of the electrode is approximately 0.95 volts if the oxidant reactant is air containing 21% oxygen and is approximately 1.00 volts if the oxidant reactant is 100% oxygen. An inert gas, such as nitrogen, is placed on the cathode during the cathode cycle or cathode fill cycle and on the anode during the anode cycle or anode fill cycle because this minimizes the current that must flow through the fuel cell 12 to effect the desired changes in electrode potential.

In a further preferred method of the first or applied voltage embodiment of the invention, a performance calibration, shown as Steps 13 and 14 of TABLE 1, may also be performed. In such a calibrating performance step, the fuel cell 12 is placed on load by closing the primary load switch 78 and a series of performance calibration cycles are performed. In the performance calibration, the D.C. power supply 80 is disconnected, the anode electrode 14 is exposed to a reducing fluid, such as hydrogen gas delivered from the anode reducing fluid source 34, the cathode electrode 16 is exposed to an oxidant reactant, such as air from the cathode oxidant source 64, and the fuel cell 12 is cycled for predetermined durations from an open circuit to closed circuit current densities starting at 0 and increasing to about 1,600 milli-amps per square centimeter ("mASC") in about 100 mASC increments, as measured by the amp meter 76. The predetermined durations are about 5 minutes. The performance calibration cycles are repeated with increasing current densities up to 10 cycles, or until a peak performance of the fuel cell 12 is achieved producing maximum design current density for the fuel cell 12.

The cycling of the potentials of the cathode electrode 16 and anode electrode 14 may be achieved in the second, or varying reactant embodiment of the invention by changing reactants on the electrodes 14, 16, as summarized in TABLE 2. For the varying reactant embodiment, no D.C. Power supply 80 is utilized, and in performing the cathode cycle the anode electrode 14 is exposed to a reducing fluid, such as 100% hydrogen, while the cathode electrode 16 is first exposed to an inert gas, such as nitrogen during the Step 1 shown in TABLE 2. That produces a change in the potential on the cathode electrode from a first cathode potential of about 0.95V to about 0.00V. Then, in Step 2 of the cathode cycle, the cathode electrode 16 is exposed to an oxidant, such as air while the anode electrode 14 continues to be exposed to the reducing fluid. That produces a change in the potential of the cathode electrode 16 back to about 0.95V. TABLE 2 also shows a time for Steps 1 and 2 as being about 2 and 1.5 minutes respectively. In Step 3 of TABLE 2, it is seen that repeated cathode cycles may be performed by repeating Steps 1 and 2, for example up to 10 times.

Ten fill cycles are typically required to achieve maximum performance for both the applied voltage embodiment and the varying reactant embodiment. One skilled in the art will recognize that the required number of fill cycles can be determined experimentally; and that the required number will be dependent on the formulation and processing conditions used to fabricate the fuel cells. One skilled in the art will also recognize that electrode formulation and processing conditions may be selected to maximize the durability of the cells over operating periods of 40,000 hours or more. Such electrodes may be advantageously broken in using either the applied voltage or varying reactant embodiments of the invention. TABLE 1 for the applied voltage embodiment shows a maximum cathode potential of 1.04 volts ("V"). Tests have been run with the applied voltage embodiment with the cathode potentials up to 1.20V with similar results to those obtained with the procedure described in TABLE 1.

In performing the anode cycle by way of the varying reactant, second embodiment, as shown in Steps 4 and 5 of TABLE 2, the cathode electrode 16 is exposed to a reducing fluid, such as 100% hydrogen, while the anode electrode 14 is first exposed to the inert gas, such as nitrogen, producing a change in the potential on the anode electrode from a first anode potential of about 0.95V to about 0.00V. Then, in Step 5, the anode electrode 14 is exposed to the oxidant, while the cathode electrode 16 continues to be exposed to the reducing fluid. That produces a change in the potential of the anode electrode 14 back to about 0.95V.

For the varying reactant embodiment, a calibrating performance step may also be applied, as shown at Steps 7 and 8 of TABLE 2, by exposing the anode electrode 14 to the reducing fluid while exposing the cathode electrode 16 to the oxidant. The fuel cell 12 is cycled for predetermined durations from an open circuit to closed circuit current densities starting at 0 and increasing to about 1,600 mASC in about 100 mASC increments. The performance calibration step further accelerates the break-in of the fuel cell 12 by decreasing necessary time to achieve peak performance.

Table 2 also shows an ordinary, "Prior-Art" break-in procedure, involving a reducing fluid on the anode electrode 14 and an oxidant on the cathode electrode 16, no usage of the D.C. Power Supply 80, and a repetition of an incremental application of the primary load up to 10 times until a designed peak performance is achieved.

Additionally, in application of the first and second embodiments described in TABLES 1 and 2, the oxidant may be air, or in contrast, the oxidant may be pure oxygen, which enhances the break-in method. The reducing fluid utilized may also be either as low as about 4 percent ("%") hydrogen, or as high as pure hydrogen. Pure hydrogen will also enhance the break-in method.

For certain fuel cell 12 designs, it may only be necessary to utilize the performance enhancing break-in procedure of the present invention for either the anode or cathode electrodes 14, 16. In such a circumstance, the invention and fuel cell system 10 is characterized as cycling a potential of an electrode selected from the group consisting of the anode electrode 14 and the cathode electrode 16 for a first electrode cycle by changing the potential of the electrode from a first potential to a second potential for a predetermined duration and then changing the potential of the electrode from the second potential back to the first potential, and then repeating the cycling of the potential for at least a second electrode cycle.

Figure 2:
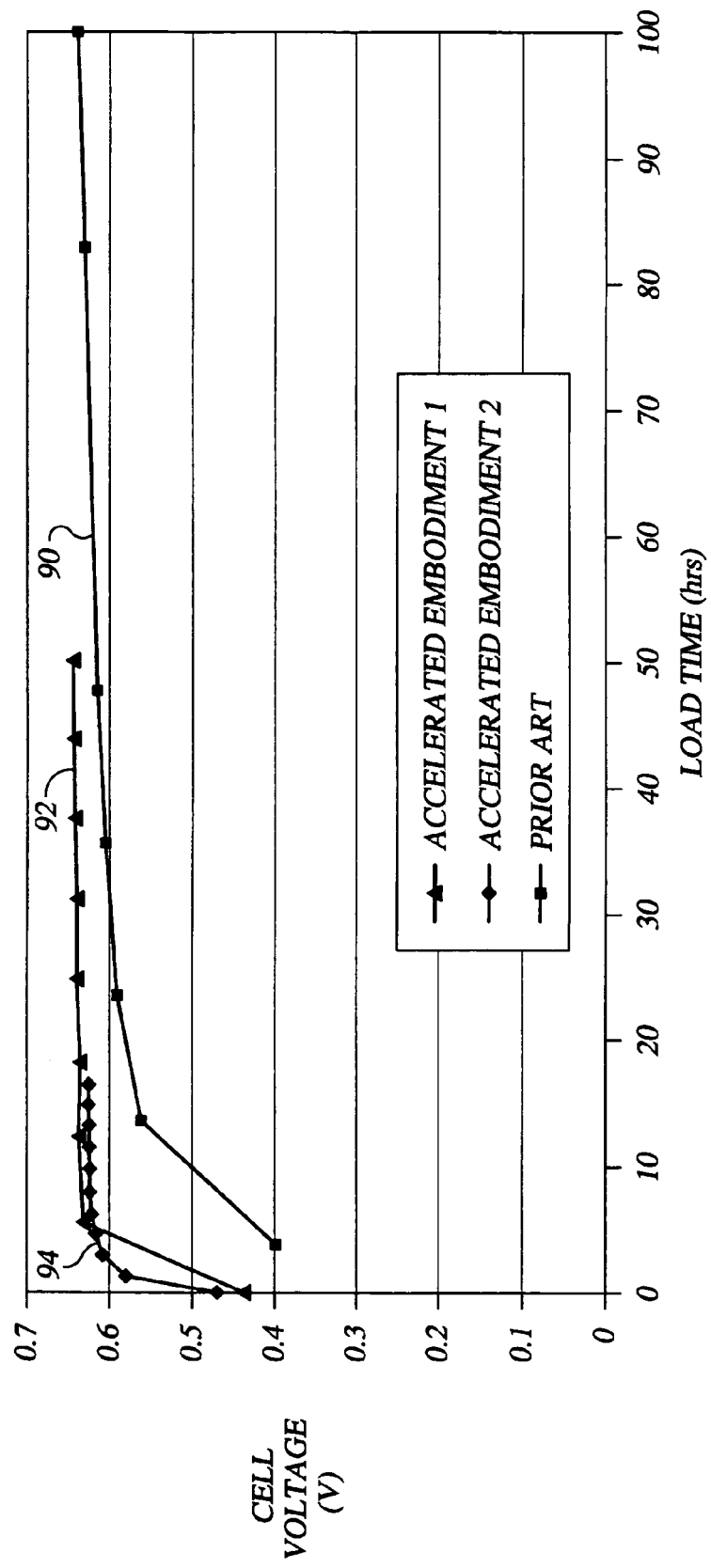
FIG. 2 is a graph showing contrasting plots of cell voltage and load time data for a prior art break-in method and for the performance enhancing break-in method for a PEM fuel cell of the present invention.

FIG. 2 shows plots of data of increasing voltages of an exemplary fuel cell over time resulting from tests of the first and second embodiments of the present invention contrasted with a prior art break-in procedure. The data line associated with reference numeral 90 shows the prior art break-in procedure taking about 70 hours to achieve about 95% of a maximum voltage. In contrast, the data line associated with reference numeral 92 shows about 95% of maximum voltage being achieved in about 5 hours through usage of the first or applied voltage embodiment of the invention. The data line associated with reference numeral 94 shows about 95% of maximum fuel cell voltage being achieved in about 5 hours through usage of the second or varying reactant embodiment of the invention. The exemplary fuel cell that generated the data shown in FIG. 2 was operated at about 65 degrees centigrade, with reactant exhaust pressures of about 14.7 psia (100 kPa). The data points plotted on the three data lines are for voltages measured at 1,000 MASC increments. As described above, in use of both embodiments of the accelerated break-in methods of, the potentials of the electrodes 14, 16 are cycled within a potential range of between 0.00 volts and 1.20 volts.

Figure 3:
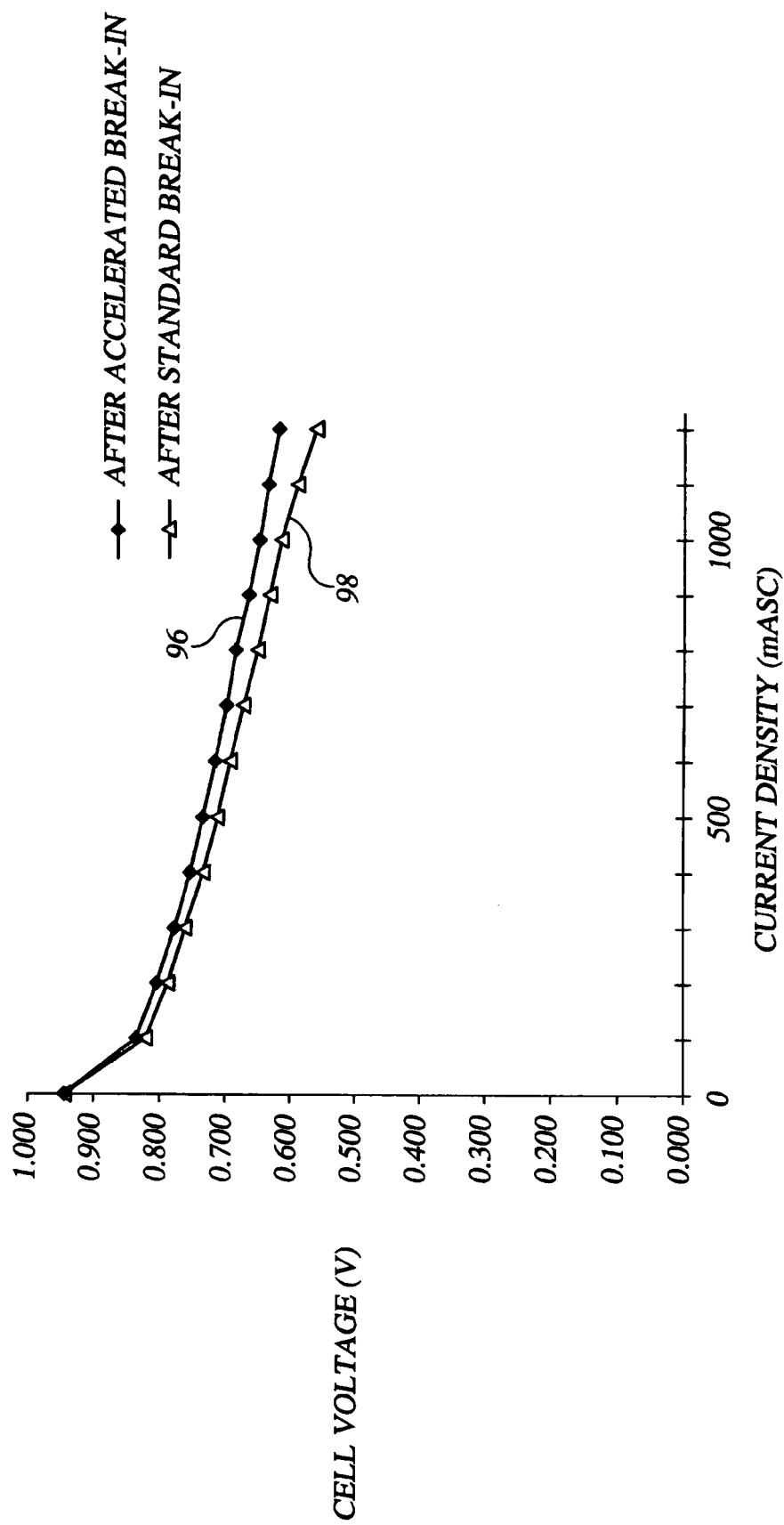
FIG. 3 is a graph showing contrasting plots of cell voltage and current density data for a prior art break-in method and for the performance enhancing break-in method for a PEM fuel cell of the present invention.

Use of the accelerated break-in methods of the present invention not only reduces a total time for the break-in period. It has also been determined that the present break-in method also enhances performance of a fuel cell. Results of further tests of the methods on an exemplary fuel cell are shown in FIG. 3. The data line associated with reference numeral 96 shows data for an exemplary fuel cell that received the break-in method of the present invention, while the data line associated with reference numeral 98 shows data for a prior art break-in method. As is apparent from the FIG. 3 graph, at a current density of about 1,200 mASC, the prior art fuel cell operated at about 0.600 V, while the exemplary fuel cell subject to the accelerated break-in operated at a higher voltage of about 0.640 V. The exemplary fuel cell that generated the FIG. 3 data had a cell configuration of about 400 square centimeters of active area operating with reactant exhaust pressures of about 14.7 psia (100 kPa), and a temperature of about 65 degrees centigrade.

The invention also includes the fuel cell system 10 of FIG. 1, or necessary portions thereof, to facilitate the described performance enhancing break-in methods for a PEM fuel cell.

While the present invention has been described and illustrated with respect to several embodiments of the performance enhancing break-in method and system for a PEM fuel cell, it is to be understood that the invention is not to be limited to the described and illustrated embodiments. Accordingly, reference should be made primarily to the following claims rather than the foregoing description to determine the scope of the invention.

What is claimed is:

1. A performance enhancing break-in method for a proton exchange membrane fuel cell (12), the fuel cell including an anode electrode (14) and a cathode electrode (16) secured to opposed sides of a proton exchange membrane electrolyte (18), the method comprising the steps of:
   a. cycling a potential of the anode electrode (14) for a first electrode cycle by changing the potential of the selected electrode (14, 16) within a potential range of between 0.00 volts to 1.20 volts front a first potential within the range to a second potential within the range and then changing the potential of the selected electrode (14, 16) from the second potential back to the first potential while exposing the anode electrode (14) to an inert gas and while exposing the cathode electrode (16) to a gas selected from the group consisting of a hydrogen containing gas, a reducing fluid reactant, and a mixture of a reducing fluid and an inert gas by lowering the potential of the anode electrode (14) within the potential range by first exposing the anode electrode (14) to the inert gas while exposing the cathode electrode (16) to the reducing fluid reactant, and
   then raising the potential of the anode electrode (14) within the potential range by exposing the anode electrode (16) to an oxidant reactant while continuing to expose the cathode electrode (16) to the reducing fluid reactant; and,
   b. repeating the cycling of the potential of the anode electrode (14, 16) for at least a second electrode cycle.

2. A performance enhancing break-in method for a proton exchange membrane fuel cell (12), the fuel cell including an anode electrode (14) and a cathode electrode (16) secured to opposed sides of a proton exchange membrane electrolyte (18), the method comprising the steps of:
   a. cycling a potential of the cathode electrode (16) for a first cathode cycle by changing the potential of the cathode electrode (16) within a potential range of between 0.00 volts to 1.20 volts from a first cathode potential within the range to a second cathode potential within the range and then changing the potential of the cathode electrode (16) from the second cathode potential back to the first cathode potential while exposing the cathode electrode (16) to an inert gas and while exposing the anode electrode (14) to a gas selected from the group Consisting of a hydrogen containing gas, a reducing fluid reactant, and a mixture of a reducing fluid and an inert gas;
   b. repeating the cycling of the potential of the cathode electrode (16) for at least a second cathode cycle;
   c. cycling a potential of the anode electrode (14) for a first anode cycle by changing the potential of the anode electrode (14) from a first anode potential within the potential range of between 0.00 volts to 1.20 volts to a second anode potential within the range and then changing the potential of the anode electrode (14) from the second anode potential back to the first anode potential while exposing the anode electrode (14) to an inert gas and while exposing the cathode electrode (16) to a gas selected from the group consisting of a hydrogen containing gas, a reducing fluid reactant and a mixture of a reducing fluid and an inert gas by lowering the potential of the anode electrode (14) within the potential range by first exposing the anode electrode (14) to the inert gas while exposing the cathode electrode (16) to the reducing fluid reactant, and then raising the potential of the anode electrode (14) within the potential range by exposing the anode electrode (14) to an oxidant reactant while continuing to expose the cathode electrode (16) to the reducing fluid reactant; and,
   d. repeating the cycling of the potential of the anode electrode (14) for at least a second anode cycle.

3. The method of claim 2, comprising the further steps of cycling the potential of the cathode electrode (16) by applying a direct electrical current to the cathode electrode (16) from a programmable direct current power source (80) to change the potential of the cathode electrode (16) from the first potential to the second potential, and then to change the potential of the cathode electrode (16) back to the first potential, and cycling the potential of the anode electrode (14) by applying a direct electrical current to the anode electrode (14) from the programmable direct current power source (80) to change the potential of the anode electrode (14) from the first potential to the second potential, and then to change the potential of the electrode (14) back to the first potential.

4. The method of claim 2 further comprising the steps of cycling the potential of the cathode electrode (16) by lowering the potential of the cathode electrode (16) within the potential range by first exposing the cathode electrode (16) to the inert gas while exposing the anode electrode (14) to the reducing fluid reactant, and then raising the potential of the cathode electrode (16) within the potential range by exposing the cathode electrode (16) to an oxidant reactant while continuing to expose the anode electrode (14) to the reducing fluid reactant.

5. The method of claim 2, further comprising the steps of, after the cycling the potential of the cathode electrode (16) step and the cycling the potential of the anode electrode (14) step, calibrating performance of the fuel cell (12) by a performance calibration step by exposing the anode electrode (14) to the reducing fluid reactant and exposing the cathode electrode (16) to an oxidant reactant, then closing a primary load switch (78) to connect a primary load (74) to the anode and cathode electrodes (14, 16) for a predetermined duration, then opening the primary load switch (78) after the duration, and then repeating the performance calibration step a predetermined number of repetitions.

* * * * *